US009424822B2

United States Patent
Bisnauth

(10) Patent No.: US 9,424,822 B2
(45) Date of Patent: Aug. 23, 2016

(54) MUSICAL SCORE DISPLAY DEVICE AND ACCESSORY THEREFOR

(71) Applicant: Terrence Bisnauth, Boca Raton, FL (US)

(72) Inventor: Terrence Bisnauth, Boca Raton, FL (US)

( * ) Notice: Subject to any disclaimer, the term of this patent is extended or adjusted under 35 U.S.C. 154(b) by 0 days.

(21) Appl. No.: 14/722,975

(22) Filed: May 27, 2015

(65) Prior Publication Data

US 2015/0348523 A1    Dec. 3, 2015

Related U.S. Application Data

(60) Provisional application No. 62/003,143, filed on May 27, 2014.

(51) Int. Cl.
*G10G 1/00* (2006.01)
*G09B 15/02* (2006.01)

(52) U.S. Cl.
CPC ............... *G10G 1/00* (2013.01); *G09B 15/023* (2013.01); *G10H 2220/015* (2013.01)

(58) Field of Classification Search
CPC .................. G10H 2220/015; G10H 2210/066; G10H 2210/091; G10G 1/00; G09B 15/023
USPC .............................. 84/609, 470 R, 477 R, 478
See application file for complete search history.

(56) References Cited

U.S. PATENT DOCUMENTS

| | | | | |
|---|---|---|---|---|
| 4,779,510 A * | 10/1988 | Van den Abbeel | ......... | 84/464 R |
| 5,400,687 A * | 3/1995 | Ishii | ............................ | 84/477 R |
| 5,760,323 A * | 6/1998 | Romero et al. | ............. | 84/470 R |
| 5,894,100 A * | 4/1999 | Otsuka | ......................... | 84/477 R |
| 5,913,259 A * | 6/1999 | Grubb et al. | .................... | 84/610 |
| 6,037,861 A | 3/2000 | Ying | | |
| 6,051,769 A * | 4/2000 | Brown, Jr. | .................... | 84/477 R |
| 6,175,070 B1 * | 1/2001 | Naples et al. | .................. | 84/609 |
| 6,392,132 B2 * | 5/2002 | Uehara | ........................ | 84/477 R |
| 6,635,815 B2 * | 10/2003 | Kosakaya et al. | .......... | 84/471 R |
| 7,041,890 B1 * | 5/2006 | Sutton | ......................... | 84/477 R |
| 7,119,266 B1 * | 10/2006 | Bittner et al. | .............. | 84/477 R |
| 7,183,476 B2 * | 2/2007 | Swingle et al. | ............. | 84/477 R |
| 7,375,273 B2 * | 5/2008 | Sawyer-Kovelman et al. | ............................... | 84/609 |
| 7,485,794 B2 * | 2/2009 | Koizumi | .......................... | 84/601 |
| 7,989,689 B2 * | 8/2011 | Sitrick et al. | ................... | 84/723 |
| 8,188,887 B2 | 5/2012 | Catten et al. | | |
| 8,344,864 B1 | 1/2013 | Al-Mutawa | | |
| 8,612,131 B2 | 12/2013 | Gutierrez et al. | | |
| 8,692,099 B2 * | 4/2014 | Sitrick | ......................... | 84/477 R |
| 8,835,741 B2 * | 9/2014 | Zhonggang | ..................... | 84/746 |
| 2003/0110926 A1 * | 6/2003 | Sitrick et al. | ............... | 84/477 R |
| 2004/0040433 A1 * | 3/2004 | Errico | ......................... | 84/477 R |

(Continued)

*Primary Examiner* — Jeffrey Donels
(74) *Attorney, Agent, or Firm* — Global Intellectual Property Agency, LLC; Daniel Boudwin

(57) ABSTRACT

An electronic device adapted to display musical scores. The musical score display device includes a display for displaying a musical score, i.e. sheet music, to a user and a foot actuator accessory operatively connectable to the musical score display device that users can use to manually scroll through the displayed musical score in a hands-free manner. Alternatively, the display device comprises a microphone and is adapted to detect the playing of musical notes and automatically scroll through the displayed musical score without action by the user. Furthermore, the display device indicates to the user as to whether each note was played correctly or incorrectly via an on-screen prompt. The musical score display device is attachable to a variety of different support articles, such as a music stand or an instrument-attachable support.

20 Claims, 4 Drawing Sheets

(56) References Cited

U.S. PATENT DOCUMENTS

| | | | |
|---|---|---|---|
| 2004/0182229 A1* | 9/2004 | Jung et al. | 84/645 |
| 2005/0081701 A1* | 4/2005 | Shao | 84/612 |
| 2008/0060500 A1* | 3/2008 | La et al. | 84/486 |
| 2008/0060507 A1* | 3/2008 | Welchering | 84/645 |
| 2009/0217803 A1* | 9/2009 | Guo et al. | 84/477 R |
| 2011/0203442 A1* | 8/2011 | Raveendran | 84/483.1 |
| 2012/0266735 A1* | 10/2012 | Dunlop | 84/329 |
| 2013/0049990 A1 | 2/2013 | Shi et al. | |

* cited by examiner

MUSICAL SCORE DISPLAY DEVICE AND ACCESSORY THEREFOR

CROSS REFERENCE TO RELATED APPLICATIONS

This application claims the benefit of U.S. Provisional Application No. 62/003,143 filed on May 27, 2014. The above identified patent application is herein incorporated by reference in its entirety to provide continuity of disclosure.

FIELD OF THE INVENTION

The present invention relates to electronic devices and music accessories. More specifically, the present invention relates to an electronic device that is adapted to display a musical score and that is controllable in either a hands-free manner.

BACKGROUND OF THE INVENTION

Sheet music can be difficult to properly secure in place and requires the use of a special stand or holder. Furthermore, musicians are forced to temporarily take their hands off of their instruments in order to turn the pages of the sheet music. This can interrupt the flow of the song the musician is playing and negatively impact the musician's performance. Therefore, there is a need in the prior art for a device that provides the ability to turn the pages of sheet music in a hands-free manner and that is conveniently securable to a variety of different support articles.

SUMMARY OF THE INVENTION

In view of the foregoing disadvantages inherent in the known types of sheet music holding or display devices now present in the prior art, the present invention provides an electronic device wherein the same can be utilized for providing convenience for the user when playing music. The present system comprises an electronic device configured for displaying musical scores and a foot-actuated accessory that allows users to control the portion of the musical score displayed by the electronic device in a hands-free manner. Users can wirelessly upload musical scores to the electronic device or physically connect a secondary electronic device to transfer musical scores thereto. Once uploaded thereto, the electronic device comprises a GUI through which users can select from the one or more musical scores stored in the non-transitory memory for display thereon. As users are playing the music from the musical score, they can actuate the foot actuator as needed to advance the displayed portion of the musical score to the next sequential portion thereof. Alternatively, the present display device can detect whether musical notes are being played and automatically advance the displayed portion of the musical score without any action taken by the user.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
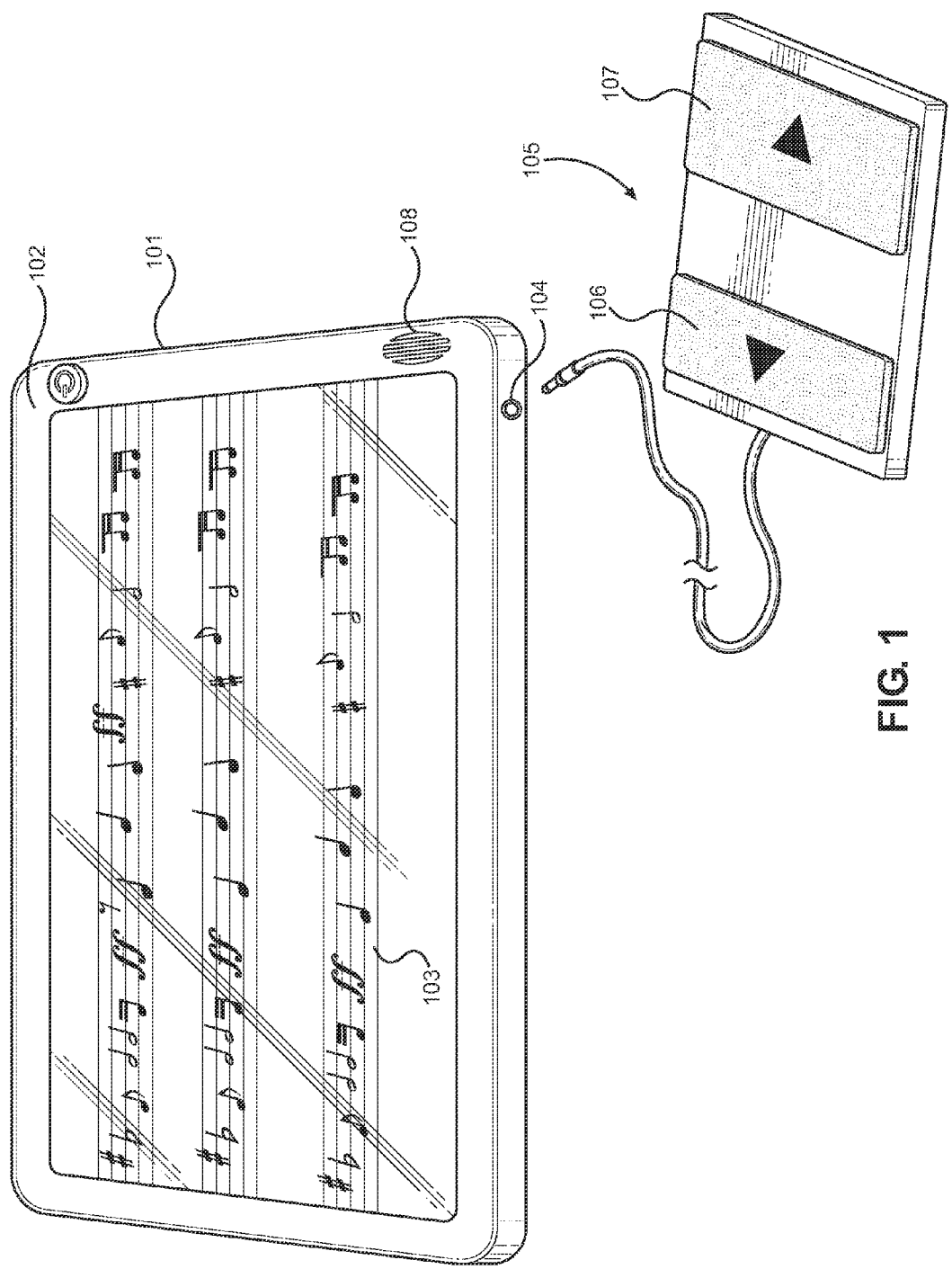
FIG. 1 shows a view of the present invention.

Reference is made herein to the attached drawings. Like reference numerals are used throughout the drawings to depict like or similar elements of the electronic musical score display device. The figures are intended for representative purposes only and should not be considered to be limiting in any respect.

As used herein, "logic" refers to (i) logic implemented as computer instructions and/or data within one or more computer processes and/or (ii) logic implemented in electronic circuitry. As used herein, "computer-readable medium" excludes any transitory signals, but includes any non-transitory data storage circuitry, e.g., buffers, cache, and queues, within transceivers of transitory signals. In the interests of economy, the present disclosure refers to "a computer-readable medium," "a processor," and so on. However, this should not be read as limiting in any way as the present disclosure contemplates embodiments of the present invention utilizing "one or more computer-readable media," "one or more processors," and so on. Unless specifically limited to a single unit, "a" is intended to be equivalent to "one or more" throughout the present disclosure.

Referring now to FIG. 1, there is shown a view of the present invention. The present invention comprises an electronic device 101 comprising a display 102 and an accessory therefor adapted to allow an individual to control the display 102 in a hands-free manner. The electronic device 101 comprises a mobile electronic device, e.g. a tablet computer. The accessory comprises a foot actuator 105, e.g. a foot pedal, operatively connectable to the electronic device 101 via a connector 104. The connector 104 comprises either a wire connector, as shown, or a wireless connector. The display 102 of the electronic device 101 is adapted to display a musical score 103. In an illustrative embodiment of the present invention, the musical score 103 is displayed in a paginated format; however, no claim is made as to the specific design of the musical score 103 as displayed by the display 102.

When the foot actuator 105 is connected to the electronic device 101, the electronic device 101 is operable in a manual control mode. When in the manual control mode, actuation of the foot actuator 105 causes the display 102 to advance the displayed portion of the musical score 103 to the next sequential portion thereof. In one embodiment of the present invention, the musical score 103 is displayed as a sequential series of pages. When the foot actuator 105 is actuated, it causes the display 102 to mimic turning a page of the displayed musical score 103, thereby displaying the subsequent page of the musical score 103. In other embodiments of the present invention, actuation of the foot actuator 105 causes the musical score 103 to scroll across the display 102. In one embodiment of the present invention, the foot actuator 105 comprises one or more movement buttons that can be used to control the movement of the musical score 103 across the display 102. In an illustrative embodiment, the movement buttons comprise a forward button 106, which causes the display 102 to display a subsequent page of the musical score 103, and a backward button 107, which causes the display 102 to display a previous page of the musical score 103.

When the foot actuator 105 is not connected to the electronic device 101, the electronic device 101 is operable in an automatic control mode. When in automatic control mode, the electronic device 101 detects the playing of music via the microphone 108 disposed thereon. When the electronic device 101 recognizes music, it automatically advances the displayed musical score 103 when it determines that the music being played is approaching the end of the musical score 103.

Figure 2A:
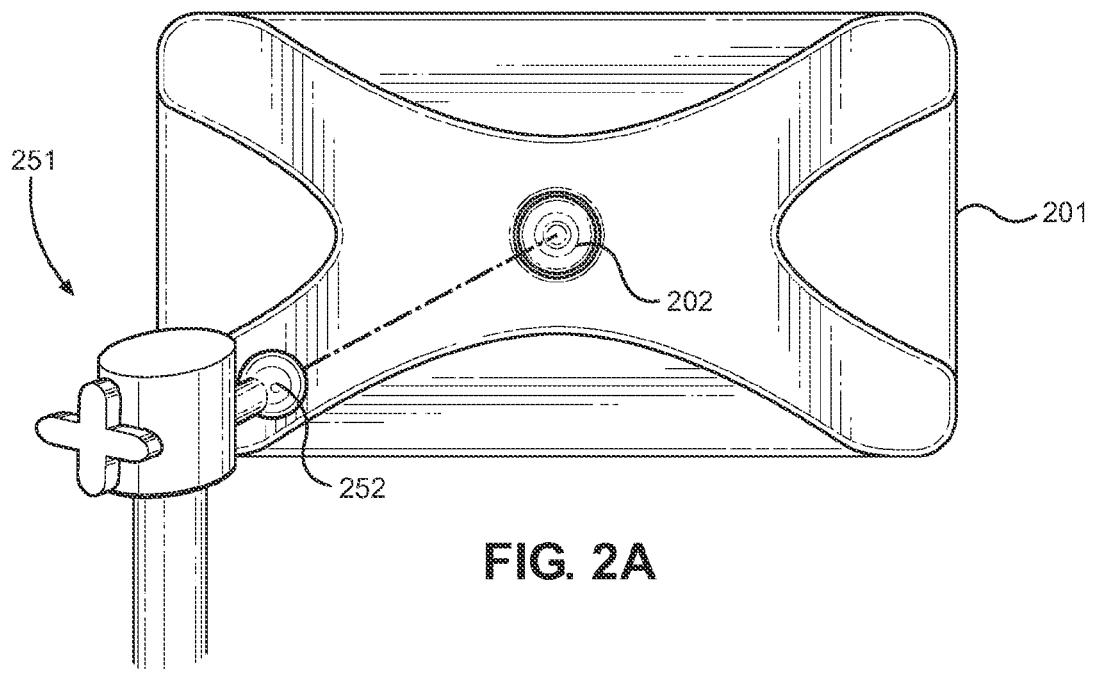
FIG. 2A shows a rear view of the electronic device of the present invention aligned with a music stand.
Figure 2B:
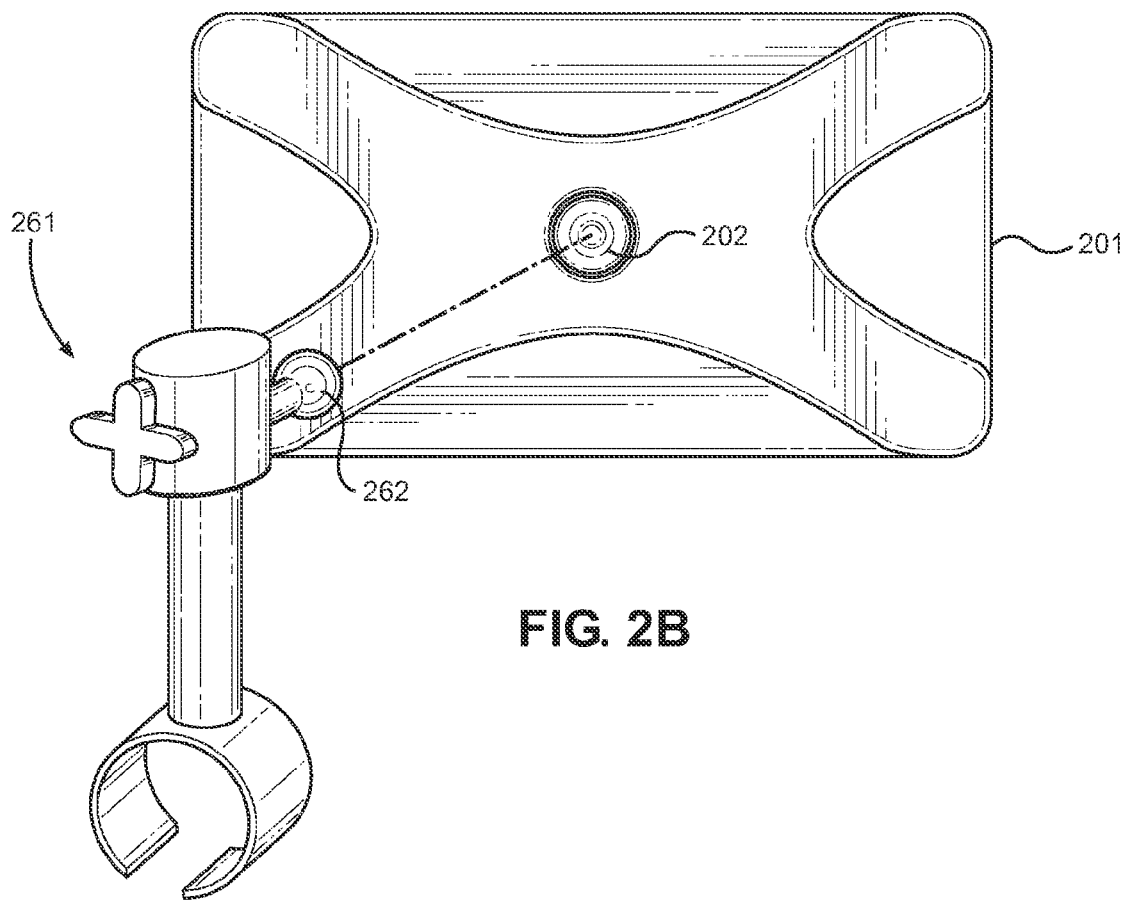
FIG. 2B shows a rear view of the electronic device of the present invention aligned with an instrument-attachable support.

Referring now to FIGS. 2A and 2B, there are shown rear views of the electronic device of the present invention aligned with alternative support articles. The electronic device 201 further comprises a connector 202 disposed on the rear surface thereof. The connector 202 is removably connectable to a support article, such as a music stand 251 or an instrument-attachable support 261. In an illustrative embodiment of the present invention, the connector 202 comprises a socket that is adapted to removably engage with a ball connector 252, 262 of a support article 251, 261. The connector 202 allows the electronic device 201 to be mountable to the support article 251, 261 in any desired orientation.

An alternative embodiment of the present invention further comprises a camera disposed on the rear surface thereof. The camera allows users to take a picture of a sheet of music and then the logic stored in the memory of the present invention is adapted analyze the picture file, use optical music recognition (OMR) to recognize the musical notes and any other characters or notations contained on the sheet using methods known in the prior art, arrange the recognized musical notes and characters, and then save generated musical score file in the memory for access at a later time.

Figure 3:
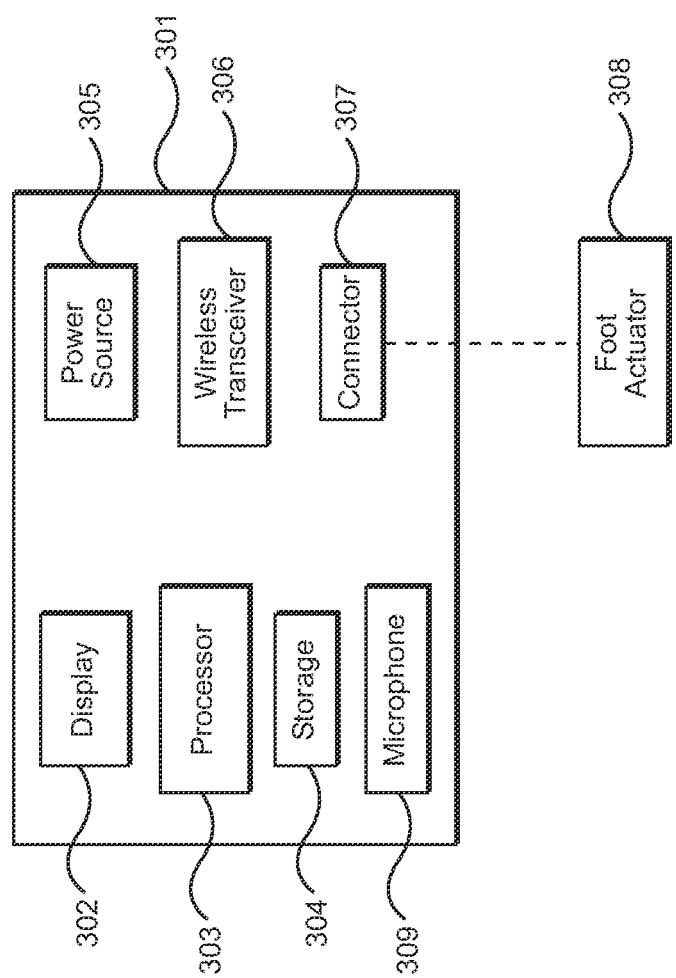
FIG. 3 shows a diagram of the electronic components of the present invention.

Referring now to FIG. 3, there is shown a diagram of the electronic components of the present invention. An illustrative embodiment of the electronic device 301 comprises a display 302, a processor 303, a computer-readable medium, e.g. a memory 304, a power source 305, a wireless transceiver 306, and a connector 307 to which the foot actuator 308 is connectable. The power source 305 is operatively connected to the electronic components of the electronic device 301. The memory 304 contains the logic that, when executed by the processor 303, causes the electronic device 301 to display a musical score and receive the signal from the foot actuator 308 when the foot actuator 308 is actuated by a user. The wireless transceiver 306 allows the electronic device 301 to be wirelessly connected to a secondary electronic device and receive musical score files therefrom. In an alternative embodiment, the present invention comprises a wired connector in lieu of or in addition to the wireless transceiver 306 for receiving musical score files from a secondary electronic device. When a musical score file is received, it is stored within the memory 304 for later access. An alternative embodiment of the present invention further comprises a microphone 309, which is adapted to detect the playing of music. When the electronic device 301 detects the playing of music, it causes the logic to analyze the detected music to determine whether the user is playing the notes properly and prompt the user as to whether the played notes are correct or incorrect.

In one embodiment of the present invention, the connector 307 to which the foot actuator 308 is connectable comprises a wired connector, e.g. a socket and jacket connection. In an alternative embodiment of the present invention, the connector 307 comprises a wireless connector, e.g. a wireless transceiver. The wireless transceiver utilizes Bluetooth or another such wireless communications protocol.

Figure 4:
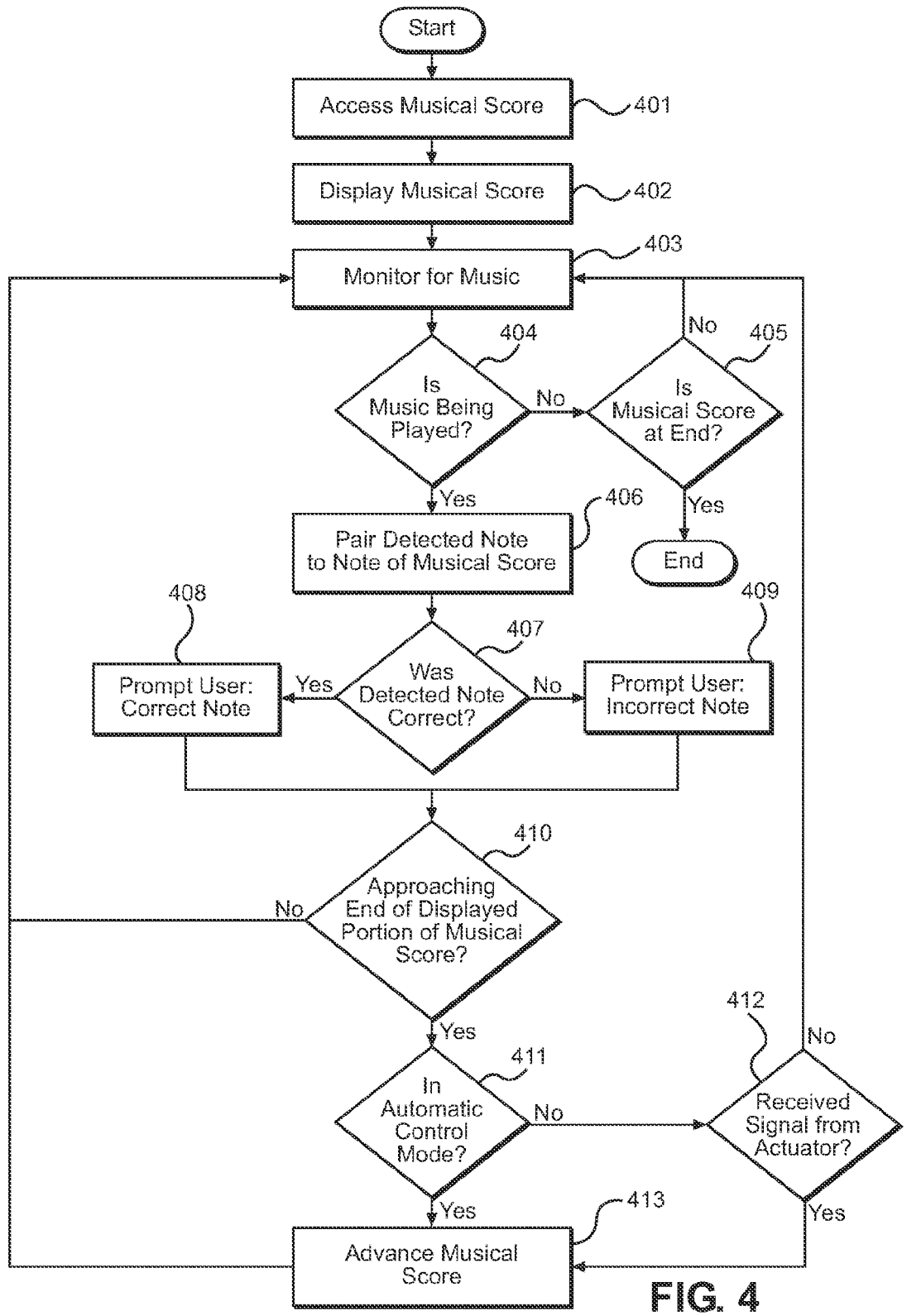
FIG. 4 shows a flowchart of the logic of the present invention.

Referring now to FIG. 4, there is shown a flowchart of the logic of the present invention. Users access a musical score that they wish the device to display using a GUI shown on the display of the electronic device. After a user has selected a musical score, the logic accesses 401 the selected musical score from the non-transitory memory and displays 402 it for viewing by a user. In one embodiment of the present invention, the electronic device is provided to users with the memory pre-loaded with one or more musical scores. In another embodiment of the present invention, users can transfer additional musical scores to the electronic device by connecting a secondary electronic device thereto via a wired or wireless connection and uploading the musical score files to the electronic device. After one or more musical scores are received by the electronic device and stored in the memory via the logic, the musical scores are thereafter selectable via the GUI. Preferably, the GUI is available in a plurality of selectable languages.

Once a musical score is displayed 402, the logic then monitors 403 the environment for music via a microphone. The logic is configured to distinguish musical notes from non-musical sounds in the environment from the environment using methods known in the prior art. If the logic does not detect any music that is being played 404, then the logic next determines whether the end of the displayed musical score is imminent 405. If the displayed musical score is completed, then the logic provides the user with the option of selecting a new musical score to play. If the musical score is not completed, then the logic continues monitoring for music 403.

If the logic detects that music is being played 404, then the logic characterizes the detected musical notes and pairs 406 the detected musical notes to the notes of the musical score. The detected musical notes and the notes of the musical score are paired in a sequential manner such that the first detected musical note corresponds to the first note of the musical score, the second detected musical note corresponds to the second note of the musical score, and so on. By pairing each discrete detected note to a corresponding note of the musical score, the logic can then compare 406 the detected note to the corresponding note of the musical score in order to determine whether the detected note was played correctly or not. If the detected note, i.e. the note played by the user, properly matches the note of the musical score, then the logic prompts the user 408 that the detected note was correct. In various embodiments of the present invention, the correct note prompt 408 comprises highlighting the displayed note of the musical score a first color, displaying an indicia, e.g. a checkmark, adjacent to the note of the musical score, or any other such prompt that is configured to indicate to a user that he or she has played a note correctly. Alternatively, if the detected note, i.e. the note played by the user, does not match the note of the musical score, then the logic prompts the user 409 that the detected note was incorrect. In various embodiments of the present invention, the incorrect note prompt 409 comprises highlighting the displayed note of the musical score a second color, displaying an indicia, e.g. an X-mark, adjacent to the note of the musical score, or any other such prompt that is configured to indicate to a user that he or she has played a note incorrectly.

Regardless of the prompt 408, 409 provided to the user, the logic next analyzes whether the end of the displayed portion of the musical score is approaching 410. The logic can determine that the end of the displayed portion of the musical score is imminent based upon the time signature of the musical score, the actual detected tempo at which the user is playing, and other such variables that allow the logic to calculate the expected length of time remaining before the user would play the final note of the displayed portion of the musical score. If the end is not approaching, then the logic continues monitoring for music 403. If the end is approaching, then the logic determines 411 whether the system is set in automatic control mode or manual control mode.

If the system is set in automatic control mode and the end of the displayed portion of the musical score is imminent, then the logic automatically advances the musical score 413. In various embodiments of the present invention, advancing the musical score 413 comprises turning a page of the paginated display of the musical score, scrolling the musical score on the screen, or otherwise displaying the subsequent sequential portion of the musical score on the display of the electronic device. If the system is not set in automatic control mode, i.e. it is in manual control mode, then the logic next detects whether it has received a signal 412 to advance the musical score from the foot actuator. When the foot actuator is actuated, it sends a signal to the electronic device. If the signal to advance the musical score has not been received from the foot actuator, then the logic does not advance the musical score and continues monitoring for music 403. If the signal to advance the musical score has been received from the foot actuator, then the logic advances the musical score 413.

In alternative embodiment of the present invention, the foot actuator comprises multiple different buttons and thus is adapted to send different signals to affect the display of the musical score in different ways. In an illustrative embodiment of the present invention, the foot actuator comprises a first button that transmits a first signal and a second button that transmits a second signal. When the logic receives the first signal, the logic causes the display to advance to the next page in the sequential listing of the musical score. When the logic receives the second signal, the logic causes the display to show the previous page in the sequential listing of the musical score.

According to some embodiments, the operations, techniques, and/or components described herein can be implemented as (i) a special-purpose computing device having specialized hardware and a logic hardwired into the computing device to persistently perform the disclosed operations and/or techniques or (ii) a logic that is implementable on an electronic device having a general purpose hardware processor to execute the logic and a computer-readable medium, e.g. a memory, wherein implementation of the logic by the processor on the electronic device provides the electronic device with the function of a special-purpose computing device.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electronic device, comprising:
    a display, a processor, a microphone, and a non-transitory computer-readable medium operatively connected to the processor;
    a logic stored in the non-transitory computer-readable medium that, when executed by the processor, causes the electronic device to perform a method, the method comprising the steps of:
        retrieving the musical score from the non-transitory computer-readable medium;
        displaying the musical score on the display;
        monitoring for music via the microphone;
        comparing a detected musical note to a musical note of the musical score;
        if the detected musical note matches the musical note of the musical score, displaying a correct note prompt, wherein the correct note prompt comprises one or more indicia displayed adjacent to each musical note of the musical score played correctly and configured to indicate to a user that the musical note has been played correctly;
        if the detected musical note does not match the musical note of the musical score, displaying an incorrect note prompt, wherein the incorrect note prompt comprises one or more indicia displayed adjacent to each musical note of the musical score played incorrectly and configured to indicate to a user that the musical note has been played incorrectly;
        advancing a displayed portion of the musical score on the display;
    wherein the electronic device is connectable to a support article.

2. The electronic device of claim 1, further comprising a foot actuator operatively connectable to the electronic device, the foot actuator adapted to transmit a signal to the electronic device when actuated that causes the displayed portion of the musical score to advance on the display.

3. The electronic device of claim 2, wherein the foot actuator further comprises one or more buttons adapted to control movement of the musical score across the display.

4. The electronic device of claim 3, wherein the one or more buttons comprise a forward button and a reverse button.

5. The electronic device of claim 2, wherein the foot actuator is connectable to the electronic device via a wired connection.

6. The electronic device of claim 2, wherein the foot actuator is connectable to the electronic device via a wireless connection.

7. The electronic device of claim 1, wherein the electronic device further comprises a socket adapted to engage with a ball connector of the support article.

8. The electronic device of claim 1, wherein the electronic device further comprises a wireless transceiver to which a secondary electronic device is connectable, the electronic device adapted to receive a musical score file from the secondary electronic device.

9. The electronic device of claim 1, wherein the electronic device further comprises a wired connector to which a secondary electronic device is connectable, the electronic device adapted to receive a musical score file from the secondary electronic device.

10. The electronic device of claim 1, wherein the musical score is displayed in a paginated format.

11. The electronic device of claim 1, wherein the musical score automatically advances on the display when an end of the displayed portion of the musical score is imminent.

12. A non-transitory computer readable medium that, when executed by a processor, causes the processor to perform a method, the method comprising the steps of:
  retrieving a musical score from the non-transitory computer-readable medium;
  displaying the musical score on a display of an electronic device;
  monitoring for music via a microphone of the electronic device;
  comparing a detected musical note to a musical note of the musical score;
  if the detected musical note matches the musical note of the musical score, displaying a correct note prompt, wherein the correct note prompt comprises one or more indicia displayed adjacent to each musical note of the musical score played correctly and configured to indicate to a user that the musical note has been played correctly;
  if the detected musical note does not match the musical note of the musical score, displaying an incorrect note prompt, wherein the incorrect note prompt comprises one or more indicia displayed adjacent to each musical note of the musical score played incorrectly and configured to indicate to a user that the musical note has been played incorrectly;
  advancing a displayed portion of the musical score on the display.

13. The non-transitory computer readable medium of claim 12, wherein the musical score advances on the display when a signal is received from a foot actuator operatively connected to the electronic device.

14. The non-transitory computer readable medium of claim 13, wherein the signal is received by the electronic device via a wired connection.

15. The non-transitory computer readable medium of claim 13, wherein the signal is received by the electronic device via a wireless connection.

16. The non-transitory computer readable medium of claim 12, wherein the musical score automatically advances on the display when an end of the displayed portion of the musical score is imminent.

17. A computer-implemented method comprising the steps of:
  retrieving a musical score from the non-transitory computer-readable medium;
  displaying the musical score on a display of an electronic device;
  monitoring for music via a microphone of the electronic device;
  comparing a detected musical note to a musical note of the musical score;
  if the detected musical note matches the musical note of the musical score, displaying a correct note prompt, wherein the correct note prompt comprises one or more indicia displayed adjacent to each musical note of the musical score played correctly and configured to indicate to a user that the musical note has been played correctly;
  if the detected musical note does not match the musical note of the musical score, displaying an incorrect note prompt, wherein the incorrect note prompt comprises one or more indicia displayed adjacent to each musical note of the musical score played incorrectly and configured to indicate to a user that the musical note has been played incorrectly;
  advancing a displayed portion of the musical score on the display.

18. The computer-implemented method of claim 17, wherein the musical score advances on the display when a signal is received from a foot actuator operatively connected to the electronic device.

19. The computer-implemented method of claim 17, wherein the musical score automatically advances on the display when an end of the displayed portion of the musical score is imminent.

20. The computer-implemented method of claim 1, wherein the one or more indicia of the correct note prompt is a checkmark and the one or more indicia of the incorrect note prompt is an X-mark.

* * * * *